United States Patent
Tomioka

(10) Patent No.: US 7,551,338 B2
(45) Date of Patent: Jun. 23, 2009

(54) OPTICAL SCANNING APPARATUS AND IMAGE-FORMING APPARATUS

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 11/432,211

(22) Filed: May 10, 2006

(65) Prior Publication Data

US 2006/0268381 A1 Nov. 30, 2006

(30) Foreign Application Priority Data

May 26, 2005 (JP) ............................. 2005-153931

(51) Int. Cl.
*G02B 26/08* (2006.01)
*B41J 27/00* (2006.01)

(52) U.S. Cl. ................. 359/207.6; 359/207.3; 347/259

(58) Field of Classification Search ................. 359/207, 359/207.1–207.11
See application file for complete search history.

(56) References Cited

U.S. PATENT DOCUMENTS

| | | | |
|---|---|---|---|
| 5,828,401 A | 10/1998 | Shiraishi | |
| 5,900,964 A | 5/1999 | Iizuka et al. | |
| 5,986,791 A * | 11/1999 | Suzuki et al. | ................ 359/207 |
| 6,046,835 A * | 4/2000 | Yamawaki et al. | .......... 359/205 |
| 6,141,118 A | 10/2000 | Yamawaki et al. | |
| 6,232,991 B1 | 5/2001 | Appel | |
| 2004/0027446 A1 | 2/2004 | Kato et al. | |

* cited by examiner

*Primary Examiner*—James Phan
(74) *Attorney, Agent, or Firm*—Canon USA Inc IP Division

(57) ABSTRACT

An optical scanning apparatus includes a light-source unit, an incident optical system for directing light beams emitted from the light-source unit to a deflecting unit, and an imaging optical system for guiding the light beams deflected from the deflecting unit to a surface to be scanned. The imaging optical system includes a toric lens whose power in the main scanning direction is different from that in the sub-scanning direction; the toric lens having the curvature centers of the meridians of a first toric surface connected to form a curved line located in a common plane Ha, and the curvature centers of the meridians of a second toric surface connected to form a curved line not located in a common plane.

9 Claims, 6 Drawing Sheets

OPTICAL SCANNING APPARATUS AND IMAGE-FORMING APPARATUS

BACKGROUND OF THE INVENTION

1. Field of the Invention

The present invention relates to an optical scanning apparatus and an image-forming apparatus using the same.

2. Description of the Related Art

To date, in an optical scanning apparatus, light beams modulated and emitted from a light-source unit are periodically deflected by a light deflector according to image signals, and converged on a plane of a photosensitive recording medium as a spot by an imaging optical system having an fθ characteristic such that images are recorded on the plane.

Recently, such imaging optical systems have been required to be faster and more compact as apparatuses such as laser-beam printers, digital copiers, and multifunctional printers increase in speed and decrease in size.

As one measure for enhancing the speed, an overfilled optical system (OFS) has been used. In the OFS, the width of incoming beams incident on a deflection plane of a light deflector (rotatable polygon mirror) is larger than the width of the deflection plane in a main scanning section. Accordingly, the diameter of the light deflector can be small and the number of planes thereof can be increased, and thus the speed of the light deflector can be enhanced.

According to this feature of the OFS, the incoming beams incident on the deflection plane of the light deflector and scanning beams deflected from the deflection plane and reaching a surface to be scanned are required to be spatially separated in a sub-scanning section.

Also, when a plurality of light beams are deflected from an identical deflection plane of a light deflector and individually emitted to a plurality of planes to be scanned in an underfilled optical system (UFS), the plurality of light beams are required to be spatially separated in the sub-scanning section after the deflection.

In order to spatially separate the light beams, for example, the direction of the incoming beams incident on the deflection plane of the light deflector is inclined with respect to the deflection plane in the sub-scanning section.

When the optical structure of the optical scanning apparatus becomes compact, the length of the optical path for spatial separation becomes short. Therefore, the inclination of the incoming beams incident on the deflection plane of the light deflector defined in the sub-scanning section is required to be larger with respect to the deflection plane. Moreover, the maximum scanning angle is required to be larger such that the length of the optical path from the deflection plane of the light deflector to the surface of a photosensitive drum (the surface to be scanned) is reduced.

However, when the inclination of the incoming beams and the scanning angle are increased as described above, the light beams obliquely incident on the deflection plane of the light deflector in the sub-scanning section draw a conical plane due to the deflection scanning of the light deflector (conical scan), resulting in the following two major problems.

A first problem is that the light beams obliquely incident on the deflection plane of the light deflector in the sub-scanning section draw a conical plane due to the deflection scanning of the light deflector, and thus, the curved scanning beams are incident on an fθ lens (imaging lens) disposed in the center of the oblique incoming beams such that a curved scanning line also appears on the surface of the photosensitive drum serving as the surface to be scanned. This is the problem of the curvature of the scanning line caused by the incoming beams obliquely incident on the deflection plane of the light deflector in the sub-scanning section.

A second problem is deterioration in imaging performance since the scanning beams that are deflected from the deflection plane and reach the surface to be scanned draw a conical plane. When the main scanning direction in the incident optical system can be defined as a main scanning direction of the light beams, the angle of the deflected light beams inclined with respect to generatrices (main scanning direction) of the fθ lens in the main scanning direction is increased with the scanning angle. That is to say, since directions (main scanning direction and sub-scanning direction) of refracting power to be given to the light beams by the lens surfaces are deviated (rotated) in areas with large scanning angles, the shape of the spot on the surface of the photosensitive drum is distorted to form, for example, a star shape. This is the problem of the deterioration in the imaging performance caused by the scanning beams drawing a conical plane.

When an optical scanning apparatus having the two problems described above is used for an image-forming apparatus, formed images are considerably deteriorated.

To date, various optical scanning apparatuses for solving these two problems have been discussed (for example, U.S. Pat. No. 6,141,118).

In U.S. Pat. No. 6,141,118, the optical axis of a toric lens used in an imaging optical system and light beams deflected by a light deflector are disposed collinear with respect to each other in the sub-scanning section, and both surfaces of the toric lens are formed such that generatrices formed by connecting the vertexes of meridians of each lens surface are curved in the sub-scanning direction. In this manner, the deterioration in the imaging performance and the curvature of the scanning line are corrected.

In this method, the generatrices of both the lens surfaces of the toric lens curved in the sub-scanning direction produce an effect equal to a case where a cylindrical lens having power in the sub-scanning direction is rotated around the optical axis of the toric lens. By action of this effect of rotating the cylindrical lens around the optical axis of the toric lens, the influence of deviation (rotation) in the directions (main scanning direction and sub-scanning direction) of the refracting power to be given by the lens surfaces to the light beams deflected by the conical scan is cancelled, and the deterioration in the imaging performance is corrected or error reduced.

However, when the lens surfaces of the toric lens are formed such that the generatrices are curved in the sub-scanning direction, the shapes of the lens surfaces become complicated. Therefore, the lens surface having a high degree of effectiveness of reduction in the deterioration in the imaging performance can be formed such that the generatrix is curved in the sub-scanning direction.

Moreover, in U.S. Pat. No. 6,141,118, the optical axis of the toric lens of the imaging optical system is inclined with respect to the incoming beams that are incident on the incident plane of the toric lens in the sub-scanning section such that the deterioration in the imaging performance and the curvature of the scanning line are regulated. However, when the maximum scanning angle (maximum angle of view) or the inclination of the incoming beams incident on the deflection plane of the light deflector with respect to the deflection plane defined in the sub-scanning section is large in the imaging optical system, the deterioration in the imaging performance and the curvature of the scanning line on the surface to be scanned over the entire range of image heights are difficult to sufficiently regulate by changing the inclination of the toric lens in the sub-scanning section.

SUMMARY OF THE INVENTION

At least one exemplary embodiment is directed to an optical scanning apparatus used in image-forming apparatuses (e.g., laser-beam printers, digital copiers, and multifunctional printers) that perform electrophotographic processes.

The present invention is directed to optical scanning apparatuses capable of correcting deterioration in imaging performance and curvature of a scanning line on a surface to be scanned and capable of forming high-definition and high-resolution images, and provides image-forming apparatuses using the same.

An optical scanning apparatus includes a light-source unit, an incident optical system for directing light beams emitted from the light-source unit to a deflecting unit, and an imaging optical system for guiding the light beams deflected from the deflecting unit to a surface to be scanned. The imaging optical system includes a toric lens whose power in the main scanning direction is different from that in the sub-scanning direction; the toric lens, which can have the curvature centers of the meridians of a first toric surface connected to form a curved line located in a common plane Ha, and the curvature centers of the meridians of a second toric surface connected to form a curved line not located in a common plane.

The optical scanning apparatus includes curvature radii of the meridians of the first toric surface of the toric lens that vary in magnitude from the optical axis of the imaging optical system toward the periphery.

The optical scanning apparatus includes the plane Ha which is not parallel to principal rays of incoming beams incident on the toric lens traveling toward the central image height of the surface to be scanned in the sub-scanning section.

The optical scanning apparatus includes the first toric surface of the toric lens that has areas that satisfy the following condition:

$$100 \leq |Ra| \text{ (mm)},$$

where Ra indicates the curvature radii of the meridians.

The optical scanning apparatus includes the condition where the direction of the light beams emitted from the light-source unit and entering a deflection plane of the deflecting unit is inclined with respect to the deflection plane in the sub-scanning section in the incident optical system.

The optical scanning apparatus includes the condition where the degree of curvature $\Delta A$ of a generatrix of the second toric surface satisfies the following conditions:

$$0 \leq \Delta A \leq 1 \text{ (mm)}$$

$$\Delta A = |Zmax - Zmin| \text{ (mm)},$$

where Zmax and Zmin indicate the maximum value and the minimum value, respectively, of the central positions of the curvature radii of the meridians of the second toric surface in the Z direction when the point of intersection of the optical axis of the second toric surface and the curved surface of the lens is defined as the origin, and an axis orthogonal to the optical axis in the sub-scanning section is defined as the Z axis.

The optical scanning apparatus includes the imaging optical system that includes a single toric lens.

The optical scanning apparatus includes the generatrix of the second toric surface of the toric lens formed by connecting the vertexes of the meridians in every area of the second toric surface is curved in the sub-scanning direction.

The optical scanning apparatus includes the condition where the curvature radii of the meridians of both the first toric surface and the second toric surface of the toric lens vary in magnitude from the optical axis of the imaging optical system toward the periphery.

An image-forming apparatus includes the optical scanning apparatus described above, a photosensitive member disposed on a surface to be scanned, a developing unit for developing electrostatic latent images on the photosensitive member as toner images, the electrostatic latent images being formed by the light beams that are emitted by the optical scanning apparatus and scan the photosensitive member, a transferring unit for transferring the developed toner images to a recording material, and a fixing unit for fixing the transferred toner images on the recording material.

An image-forming apparatus includes the optical scanning apparatus described above, and a printer controller converting code data input by an external apparatus into image signals and sending the signals to the optical scanning apparatus.

A color-image forming apparatus includes a plurality of optical scanning apparatuses described above, and a plurality of image carriers disposed on planes to be scanned of the optical scanning apparatuses and each forming images of a corresponding color.

The color-image forming apparatus includes a printer controller converting color signals input by an external apparatus into image data of different colors and sending pieces of the data to the respective optical scanning apparatuses.

According to an aspect of the present invention, optical scanning apparatuses capable of forming high-definition and high-resolution images and image-forming apparatuses using the same can be realized by forming a simplified toric lens of an imaging optical system such that deterioration in imaging performance and curvature of a scanning line on a surface to be scanned are corrected.

Further features of the present invention will become apparent from the following description of exemplary embodiments with reference to the attached drawings.

DESCRIPTION OF THE EMBODIMENTS

Figure 1A:
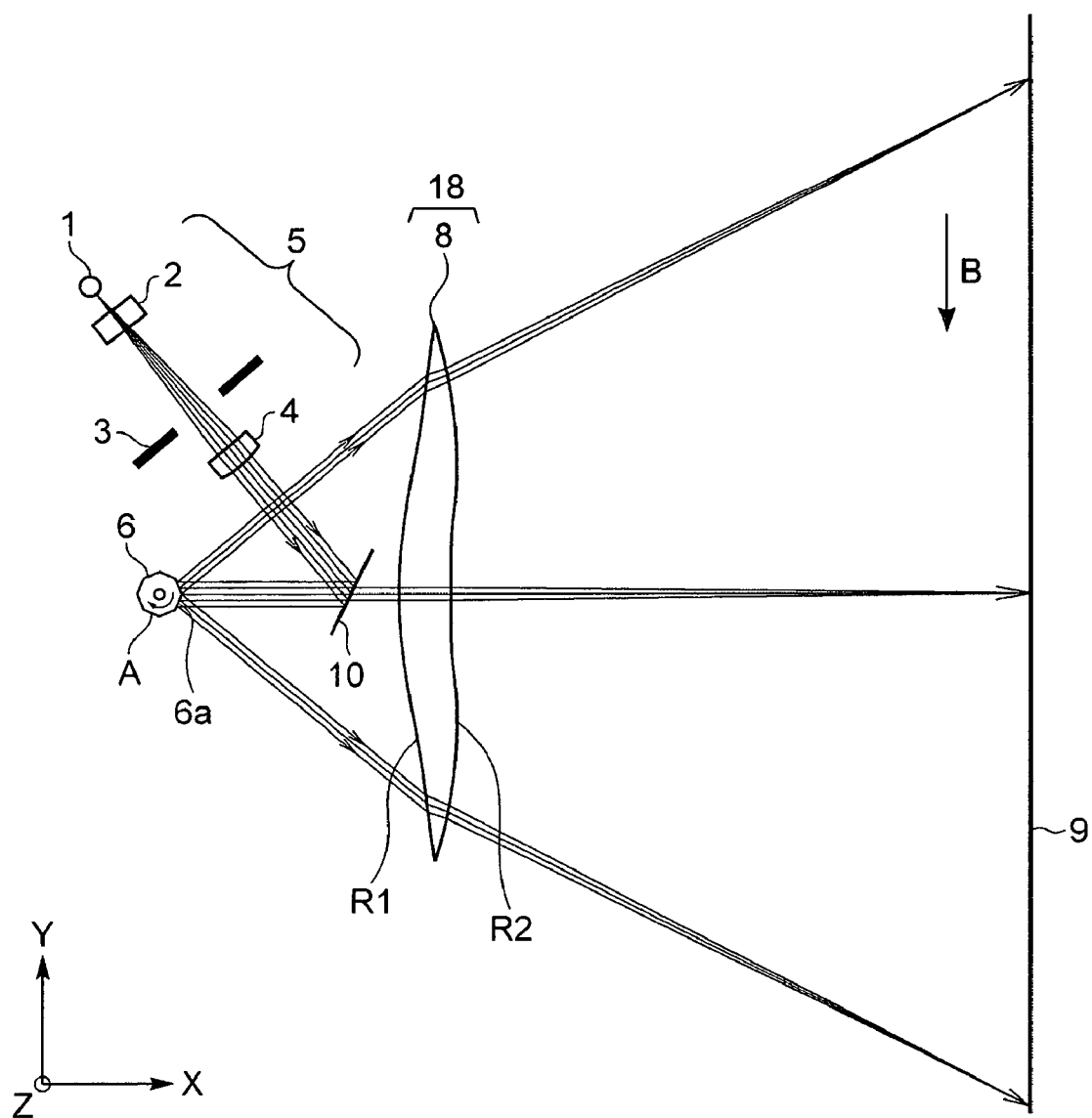
FIG. 1A is a schematic of a main scanning section according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example radius of curvatures, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of the present invention will now be described with reference to the drawings.

First Exemplary Embodiment

Figure 1B:
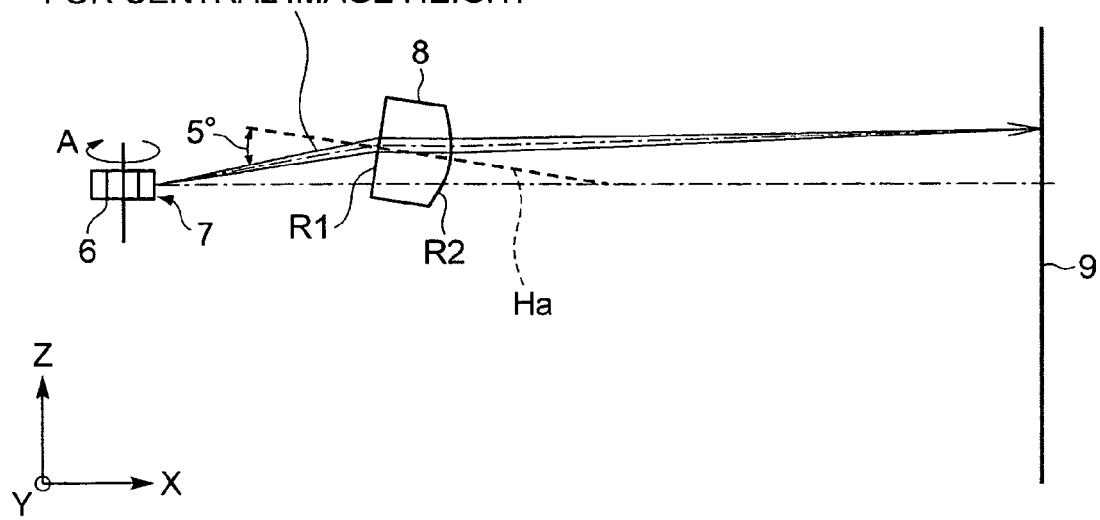
FIG. 1B is a schematic of a sub-scanning section according to the first exemplary embodiment of the present invention.

FIG. 1A is a cross-sectional view of principal parts in the main scanning direction (main scanning section) according to a first exemplary embodiment of the present invention, and FIG. 1B is a cross-sectional view of the principal parts in the sub-scanning direction (sub-scanning section) according to the first exemplary embodiment of the present invention.

Herein, the main scanning direction is a direction perpendicular to the rotation axis of a light deflector and the optical axis of an imaging optical system (the direction in which light beams are deflected by the light deflector). Herein, the sub-scanning direction is a direction parallel to the rotation axis of the light deflector. Moreover, the main scanning section is a plane parallel to the main scanning direction including the optical axis of the imaging optical system. Furthermore, the sub-scanning section is a section perpendicular to the main scanning section.

In the drawings, a light-source unit 1 can include a multi-beam monolithic semiconductor laser having two luminous points. In this exemplary embodiment, the number of the luminous points is two, but at least one exemplary embodiment is not limited to this and the number can be three or more, or one.

A cylindrical lens 2, which can have a predetermined power only in the sub-scanning direction, focuses incoming beams on a deflection plane (reflection plane) 6a of a light deflector 6 described below in the sub-scanning section so as to form line images.

An aperture 3 regulates passing beams and adjusts the shape of the beams.

A spherical lens (focusing lens) 4 converts the state of the light beams regulated by the aperture 3 into a different state.

The cylindrical lens 2 and the spherical lens 4 can be one optical element.

A reflecting mirror 10 reflects the light beams passing through the spherical lens 4 toward the light deflector 6.

An incident optical system 5 includes components such as the cylindrical lens 2, the aperture 3, the spherical lens 4, and the reflecting mirror 10.

In this exemplary embodiment, the width of the light beams emitted from the light-source unit 1 and entering the deflection plane 6a is made larger than the width of the deflection plane 6a of the light deflector 6 in the main scanning section by the incident optical system 5 (overfilled optical system; OFS).

The light deflector 6 can function as a deflecting unit, and can be formed of a rotatable polygon mirror. The light deflector 6 is rotated in a direction of an arrow A in the drawings at a constant speed by a driving unit such as a motor (not shown).

An imaging optical system 18 has a light-condensing function and an fθ characteristic, and includes a single toric lens (fθ lens) 8 which includes a resin material whose power in the main scanning direction is different from that in the sub-scanning direction. The imaging optical system 18 focuses the light beams, formed on the basis of image information, deflected by the light deflector 6 on a surface of a photosensitive drum 9 serving as a surface to be scanned in the main scanning section so as to form a spot. Furthermore, the deflection plane 6a of the light deflector 6 and the surface of the photosensitive drum 9 are optically conjugate in the sub-scanning section for surface-tilting correction.

According to the toric lens 8 in this exemplary embodiment, the curvature centers of the meridians of a second lens surface (emitting plane) R2 connected to form a curved line are not located in an identical plane (i.e. common plane), and the curvature centers of the meridians of a first lens surface (incident plane) R1 connected to form a curved line are located in an identical plane (i.e. common plane) Ha. Furthermore, the first lens surface R1 is toric and the curvature radii of the meridians vary depending on the positions of the radii in the main scanning direction. That is to say, the curvature radii of the meridians of the first lens surface R1 vary in magnitude from the optical axis of the imaging optical system (center of the toric surface) toward the periphery.

The surface of the photosensitive drum 9 serves as a surface to be scanned, and a focused spot scans the surface of the photosensitive drum 9 in the main scanning direction with a constant velocity.

In this exemplary embodiment, two light beams emitted from the light-source unit 1 are converted into divergent beams in the main scanning section and converted into slightly divergent beams in the sub-scanning section by the cylindrical lens 2. The beams then pass through the aperture 3 (part of each of the beams is shielded by the aperture 3) and enter the spherical lens 4. The spherical lens 4 converts the incoming beams into slightly convergent beams in the main scanning section. The slightly convergent beams enter the deflection plane 6a from the center of the deflection angle (scanning angle) of the deflection plane 6a of the light deflector 6 (center of the scanning range on the surface to be scanned) via the reflecting mirror 10 (frontal incidence). The width of the incoming beams incident on the deflection plane 6a at this time is sufficiently wide with respect to a facet width of the deflection plane 6a of the light deflector 6 in the main scanning section (OFS). On the other hand, the incoming beams are focused on the deflection plane 6a of the light deflector 6 so as to form line images (extending in the main scanning direction) in the sub-scanning section. At this time, the incoming beams are obliquely incident on the deflection plane 6a at a predetermined angle with respect to a plane perpendicular to the rotation axis of the light deflector 6 (a rotational plane of the light deflector 6) in the sub-scanning section including the rotation axis of the light deflector 6 and the optical axis of the imaging optical system 18 (oblique-incidence optical system). That is to say, principal rays of the light beams incident on the deflection plane 6a are inclined with respect to the deflection plane 6a in the sub-scanning section.

The two light beams deflected from the deflection plane 6a of the light deflector 6 are then guided to the surface of the photosensitive drum 9 via the toric lens 8, and the light beams scan the surface of the photosensitive drum 9 in a direction of an arrow B (main scanning direction) by rotating the light deflector 6 in the direction of the arrow A. In this manner, images are recorded on the surface of the photosensitive drum 9 serving as a recording medium.

In this exemplary embodiment, the maximum scanning angle is set to a wide angle of ±40.5° and the length Ld of an optical path from the deflection plane 6a of the light deflector 6 to the surface of the photosensitive drum 9 is reduced such that the entire optical scanning apparatus becomes compact. Moreover, in this exemplary embodiment, the incoming beams incident on the deflection plane 6a are inclined with respect to the deflection plane 6a at a predetermined angle (3° in this exemplary embodiment) in the sub-scanning section such that the scanning beams deflected from the deflection plane 6a of the light deflector 6 can be easily spatially separated in the sub-scanning section.

Moreover, in this exemplary embodiment, the imaging optical system 18 includes only one toric lens 8 for simplicity (cost reduction). Furthermore, in order to ensure adequate fθ performance over the wide scanning angle with only one toric lens 8, the generatrices of the toric lens 8 in the main scanning direction defined in the main scanning section are non-arc shaped (gull-wing shaped) having inflection points as illustrated in FIG. 1A.

Since the generatrices of the toric lens 8 in the main scanning direction have the inflection points as described above, positions of principal points in the meridian direction (sub-scanning direction) are required to be actively changed according to image heights by continuously changing the curvature radii of the meridians of the first lens surface (incident plane) R1 and the second lens surface (emitting plane) R2 of the toric lens 8 with respect to the main scanning direction such that uniformity in magnification in the sub-scanning direction is ensured.

Figure 2:
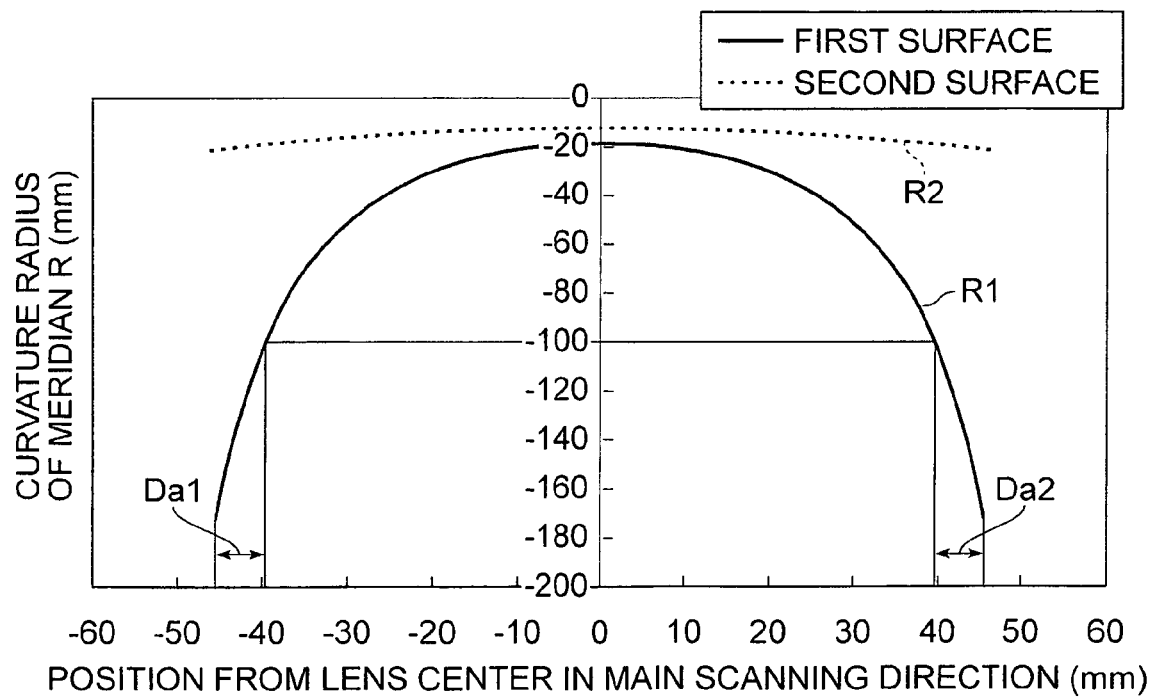
FIG. 2 illustrates the curvature radii of the meridians of an fθ lens according to the first exemplary embodiment of the present invention.

Therefore, in this exemplary embodiment, the curvature radii R of the meridians of both the first lens surface R1 and the second lens surface R2 of the toric lens 8 are continuously changed with respect to the main scanning direction as illustrated in FIG. 2 such that uniformity in magnification in the sub-scanning direction is ensured. That is to say, the curvature radii R of the meridians of both the first lens surface (toric surface) R1 and the second lens surface (toric surface) R2 vary in magnitude from the optical axis of the imaging optical system (center of the toric surfaces) toward the periphery.

FIG. 2 illustrates the curvature radii R of the meridians of the first lens surface (toric surface) R1 and the second lens surface (toric surface) R2 of the toric lens 8 according to this exemplary embodiment with respect to the main scanning direction at positions from the centers of the toric surfaces (the optical axis of the imaging optical system).

In FIG. 2, the curvature centers of the meridians of the first lens surface R1 connected to form a curved line are located in the identical plane (i.e. common plane) Ha, and the curvature centers of the meridians of the second lens surface R2 connected to form a curved line are not located in an identical plane (i.e. common plane). The generatrix of the second lens surface R2 formed by connecting the vertexes of the meridians in every area of the second lens surface R2 is curved in the sub-scanning direction. However, according to at least one exemplary embodiment, the curvature centers of the meridians of the second lens surface R2 connected to form a curved line can be located in the identical plane (i.e. common plane) Ha, and the curvature centers of the meridians of the first lens surface R1 connected to form a curved line can not be located in an identical plane (i.e. common plane).

As is clear from FIG. 2, the curvature radii R of the meridians of the second lens surface (toric surface) R2 in the outer portion of the toric surface (remote from the optical axis of the imaging optical system) are larger than those in the central portion (adjacent to the optical axis of the imaging optical system). The curvature radii R of the meridians are in the following range:

$$-11 < R < -22 \text{ (mm)}$$

Thus, the curvature radii R of the meridians are sufficiently small over the entire area of the lens of use and an effect of the curvature of the generatrix can be expected.

On the other hand, the curvature radii R of the meridians of the first lens surface (toric surface) R1 in the outer portion (remote from the optical axis of the imaging optical system) are larger than those in the central portion (adjacent to the optical axis of the imaging optical system), and the curvature radii R of the meridians at ends are set to a large value of approximately −172 mm.

In FIG. 2, areas Da1 and Da2 of the first lens surface R1 satisfy the following condition:

$$100 \leq |Ra| \text{ (mm)}$$

where Ra indicates the curvature radii of the meridians in the main scanning direction.

Power 1/Ra in the meridian direction is small at positions where the curvature radii Ra of the meridians of the first lens surface R1 adjacent to the ends are large. Therefore, an effect of rotating the toric lens 8 around the optical axis is little, and thus an effect of cancelling influences caused by the deviation (rotation) of the directions (main scanning direction and sub-scanning direction) of the refracting power to be given to the deflected light beams by the lens surface is little even when the generatrix is acutely curved in the sub-scanning direction.

Therefore, in this exemplary embodiment, the generatrix of the second lens surface R2 of the toric lens 8 is curved in the sub-scanning direction (the curvature centers of the meridians of the second lens surface R2 connected to form a curved line are not located in an identical plane (i.e. common plane)) since the effect of the curvature of the generatrix of the second lens surface R2 in the sub-scanning direction can be expected, and the generatrix of the first lens surface R1 is not curved in the sub-scanning direction (the curvature centers of the meridians of the first lens surface R1 connected to form a curved line are located in the identical plane (i.e. common plane) Ha) such that the deterioration in the imaging performance is effectively reduced.

Moreover, in this exemplary embodiment, the plane Ha in which the curvature centers of the meridians of the first lens surface R1 of the toric lens 8 are located is not parallel to the principal rays of the incoming beams incident on the toric lens 8 propagating toward the central image height (a height of an intersection of the optical axis and the surface to be scanned) of the surface of the photosensitive drum 9 as illustrated in FIG. 1B. Specifically, the toric lens 8 is inclined by 5° in the sub-scanning section such that the first lens surface R1 can also produce an effect of cancelling influences caused by the deviation (rotation) of the directions (main scanning direction and sub-scanning direction) of the refracting power to be given to the deflected light beams by the lens surface.

In this manner, the deterioration in the imaging performance and the curvature of the scanning line can be appropriately corrected even if the curvature of the generatrix of the first lens surface R1 in the sub-scanning direction produces no effect. Moreover, lens warpage caused by the large curvature of the generatrix generated during fabrication of the lens can be regulated since the curvature of the generatrix of the second lens surface R2 in the sub-scanning direction, the curvature being required to correct and/or reduce the deterioration in the imaging performance and the curvature of the scanning line, can be small. Thus, the lens fabrication is facilitated.

Figure 3:
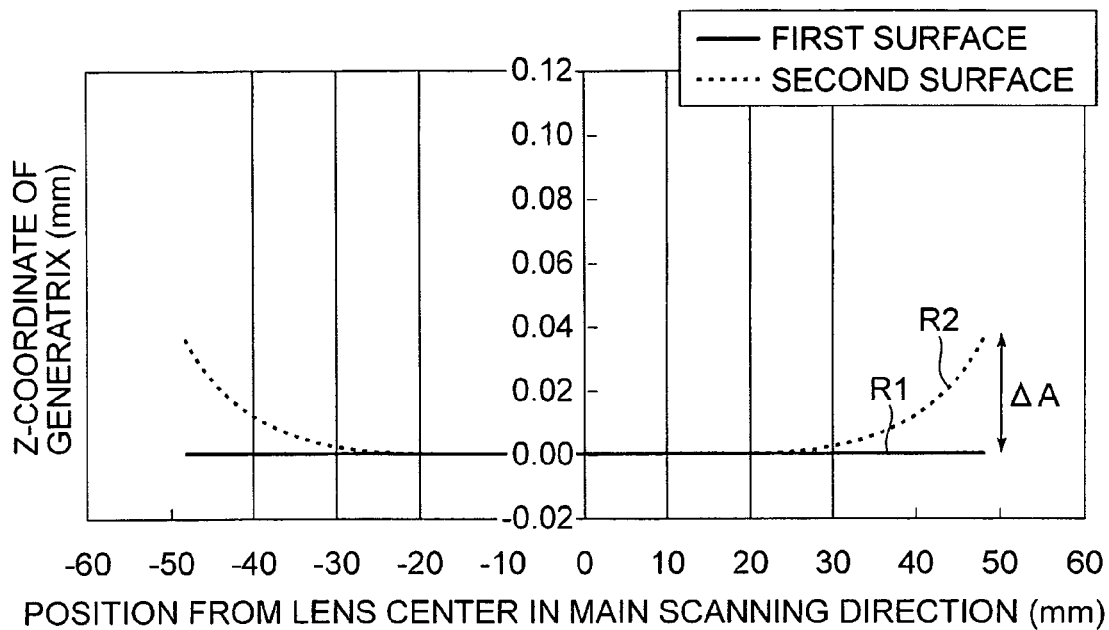
FIG. 3 illustrates curvatures of generatrices according to the first exemplary embodiment of the present invention.

FIG. 3 illustrates the shapes of the generatrices of the first lens surface R1 and the second lens surface R2 of the toric lens 8 according to this exemplary embodiment. As is clear from FIG. 3, the generatrix of the second lens surface R2 is curved in the Z direction, and the degree of the curvature $\Delta A$ is 30 μm, which is sufficiently small and causes no trouble in fabrication of the lens.

When the point of intersection of the optical axis and the curved second lens surface R2 is defined as the origin and the axis orthogonal to the optical axis in the sub-scanning section is defined as the Z axis (a side adjacent to the deflection point of the deflecting unit is negative), the Z coordinate in FIG. 3 indicates the height of the central positions of the curvature radii of the meridians of the second lens surface R2 in the Z direction. Accordingly, the degree of the curvature $\Delta A$ of the generatrix of the second lens surface R2 in the Z direction in FIG. 3 can be represented by the following expression:

$$\Delta A = |Zmax - Zmin| \text{ (mm)}, \quad (a)$$

where Zmax and Zmin indicate the maximum value and the minimum value, respectively, of the central positions of the curvature radii of the meridians of the toric surface in the Z direction. Since Zmax is 0.03 mm and Zmin is 0 mm in the second lens surface R2, the degree of the curvature $\Delta A$ of the generatrix of the second lens surface R2 in the Z direction is 0.03 mm. At this time, the degree of the curvature $\Delta A$ satisfies the following condition:

$$0 \leq \Delta A \leq 1 \text{ (mm)}. \quad (b)$$

When this conditional expression (b) is satisfied, the lens warpage caused by the large curvature of the generatrix generated during fabrication of the lens can be regulated. Moreover, in this exemplary embodiment, the Z coordinate of the generatrix of the second lens surface R2 in the outer portion of the lens is larger than that in the central portion in the main scanning direction (the side adjacent to the deflection point of the deflecting unit is negative) such that rotation of the spot and the curvature of the scanning line caused by the conical scan are regulated.

Figure 4:
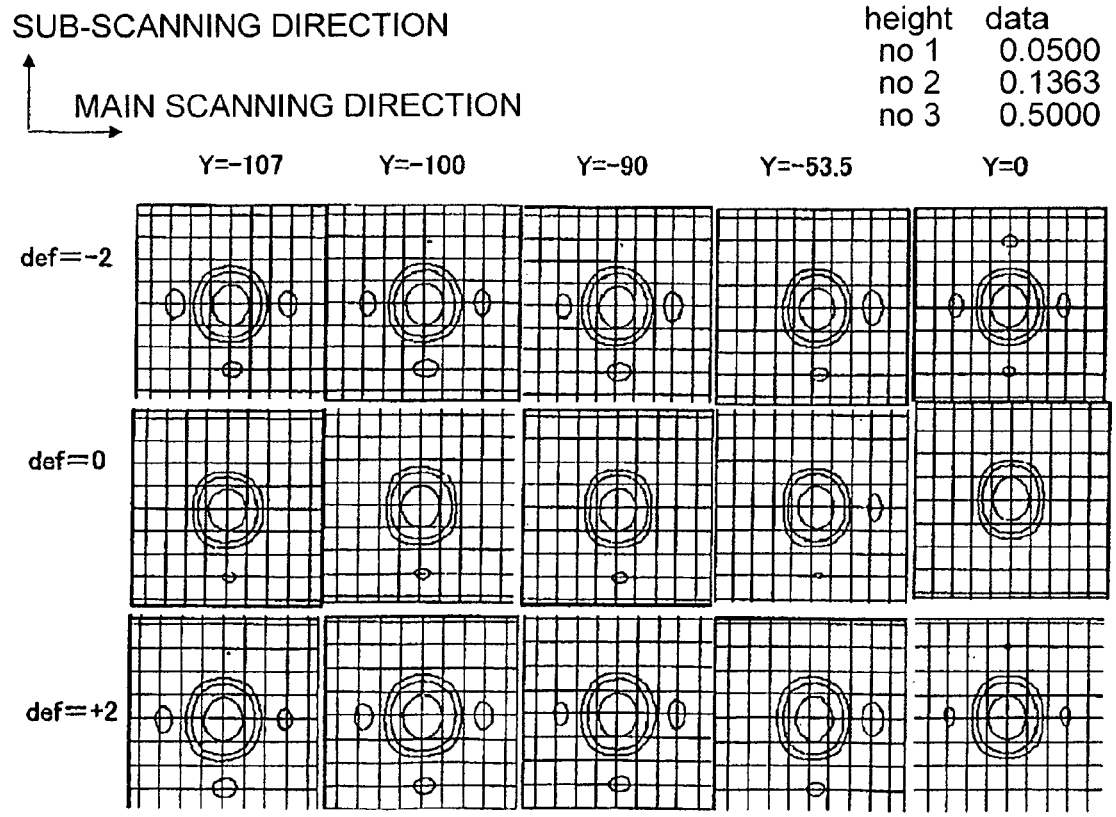
FIG. 4 illustrates the shapes of a spot at various image heights according to the first exemplary embodiment of the present invention.

FIG. 4 illustrates the shapes of the focused spot at the image heights Y of −107, −100, −90, −53.5, and 0 according to this exemplary embodiment. As is clear from FIG. 4, the shape of the focused spot is appropriate at all the image heights.

Figure 5:
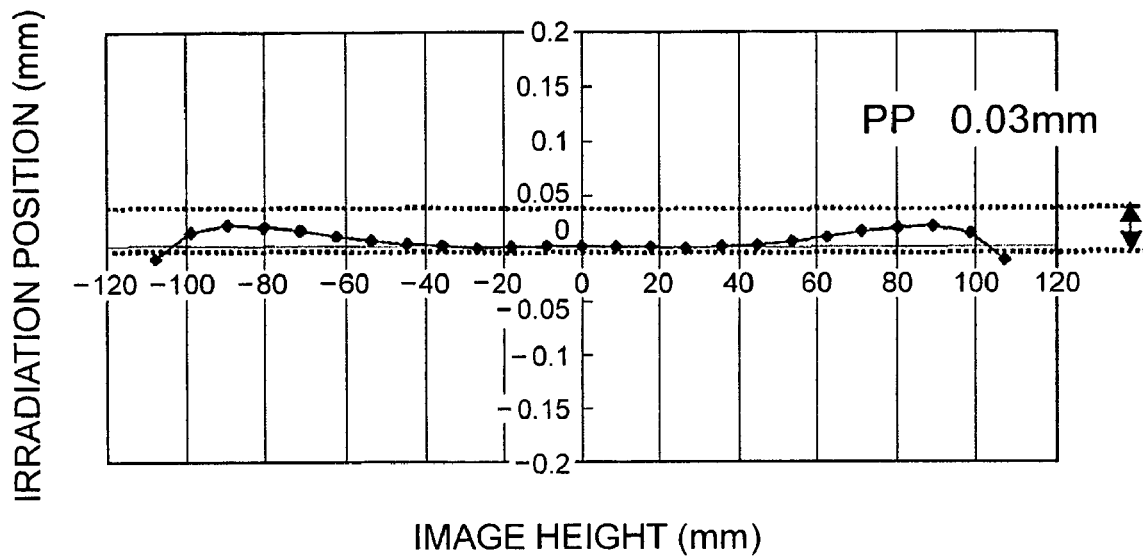
FIG. 5 illustrates the curvature of a scanning line according to the first exemplary embodiment of the present invention.

FIG. 5 illustrates the curvatures of the scanning line on the surface of the photosensitive drum according to this exemplary embodiment. As is clear from FIG. 5, the curvature of the scanning line is regulated to 30 μm or lower in a range of an effective scanning area of ±107 mm, which is one pixel or lower with respect to a scanning-line density of 600 dpi (resolution of 42.3 μm), and thus sufficient optical performance is ensured.

In this exemplary embodiment, the inclination of the toric lens 8 in the sub-scanning section and the curvature of the generatrix with respect to the sub-scanning direction are both utilized. Accordingly, even when the maximum scanning angle (maximum angle of view) or the inclination of the incoming beams incident on the deflection plane of the light deflector with respect to the deflection plane defined in the sub-scanning section is large, and thus the deterioration in the imaging performance and the curvature of the scanning line caused by the conical scan are large, these can be reduced so as to be negligible.

In this exemplary embodiment, the curvature radii of the meridians of both the first lens surface R1 and the second lens surface R2 of the toric lens 8 vary with respect to the main scanning direction such that uniformity in magnification in the sub-scanning direction is ensured with consideration of the shape of the generatrix of the toric lens 8 in the main scanning direction. However, at least one exemplary embodiment is not limited to those described above, and, for example, the curvature radii of the meridians can be constant in at least one exemplary embodiment uniformity in magnification in the sub-scanning direction is sufficiently ensured.

Moreover, in this exemplary embodiment, the optical axis of the toric lens 8 is inclined with respect to the principal rays of scanning beams in the sub-scanning section. However, at least one exemplary embodiment is not limited to this, and, for example, the optical axis of the toric lens 8 can not be inclined with respect to the principal rays of scanning beams in the sub-scanning section when the inclination of the incoming beams incident on the deflection plane of the light deflector is small with respect to the deflection plane defined in the sub-scanning section and the deterioration in the imaging performance caused by the conical scan is negligible. A similar effect as in this exemplary embodiment can also be achieved by only curving the generatrix of one lens surface of the toric lens 8 in the sub-scanning direction.

Furthermore, in this exemplary embodiment, the toric lens 8 is symmetrical with respect to the optical axis of the imaging optical system in the main scanning section since the incoming beams are incident on the light deflector from the center of the deflection angle of the deflection plane (frontal incidence). However, at least one exemplary embodiment is not limited to this, and the toric lens 8 can be asymmetrical with respect to the optical axis of the imaging optical system in the main scanning section.

Moreover, in this exemplary embodiment, the F-number (Fno) of the incident system in the main scanning direction is 7 and the F-number of the incident system in the sub-scanning direction is 6.4, and accordingly, the F-number of the incident system in the sub-scanning direction is larger (i.e., brighter) than that in the main scanning direction. Thus, the incident optical system 5 includes the cylindrical lens 2 and the spherical lens 4 in this order from the light-source unit 1 such that the length of the optical path is reduced. However, at least one exemplary embodiment is not limited to this, and, for example, the spherical lens 4 and the cylindrical lens 2 can be disposed in this order from the light-source unit 1 in the optical path.

Moreover, in this exemplary embodiment, the incident optical system 5 is an OFS. However, at least one exemplary embodiment is not limited to this, and, for example, the incident optical system 5 of an underfilled optical system (UFS) can produce a similar effect as in the first exemplary embodiment. Furthermore, in this exemplary embodiment, the light beams incident on the light deflector 6 slightly converge. However, at least one exemplary embodiment is not limited to this, and, for example, light beams that are parallel or slightly diverge can be used to produce a similar effect as in the first exemplary embodiment.

Moreover, in this exemplary embodiment, the imaging optical system 18 is of a single-path type. However, at least one exemplary embodiment is not limited to this, and, for example, the imaging optical system 18 can be of a double-path type. Furthermore, in this exemplary embodiment, the imaging optical system 18 includes only one lens. However, at least one exemplary embodiment is not limited to this, and, for example, the imaging optical system 18 can include a plurality of lenses. In addition, the imaging optical system 18 can include a curved mirror or a diffraction optical element. The single-path system herein means an optical system where the scanning beams deflected from the deflection plane 6a of the light deflector 6 and reaching the surface to be scanned pass through the toric lens 8 of the imaging optical system 18. The double-path system herein means an optical system where both of the scanning beams deflected from the deflection plane 6a of the light deflector 6 and reaching the a surface to be scanned and the incoming beams incident on the deflection plane 6a of the light deflector 6 pass through the toric lens 8 of the imaging optical system 18.

Moreover, in this exemplary embodiment, the light beams incident on the deflection plane 6a of the light deflector 6 enter the deflection plane 6a from the center of the deflection angle of the deflection plane in the main scanning section (frontal incidence). That is to say, the light beams incident on the deflection plane 6a of the light deflector 6 enter the deflection plane 6a along the optical-axis direction of the imaging optical system. However, at least one exemplary embodiment is not limited to this, and, for example, the light beams incident on the deflection plane 6a of the light deflector 6 can obliquely enter the deflection plane 6a in the main scanning section.

Moreover, in this exemplary embodiment, both the surfaces of the toric lens 8 are non-arc shaped with respect to the main scanning direction such that the fθ characteristic can be obtained by using only one toric lens. However, at least one exemplary embodiment is not limited to this, and, for example, arc-shaped surfaces of the toric lens with respect to the main scanning direction can also produce a similar effect as in the first exemplary embodiment. Furthermore, in this exemplary embodiment, the toric lens 8 can be made of various materials (e.g., glass, resin, and other lens materials as known by one of ordinary skill in the relevant arts).

Next, the configuration of the optical scanning apparatus according to this exemplary embodiment will be shown in Table 1. Curvature radii R, intervals D, and refractive indexes N of the scanning optical system according to this exemplary embodiment will be shown in Table 2. The aspherical shape of the toric lens (fθ lens) 8 according to this exemplary embodiment will be shown in Table 3.

TABLE 1

Configuration in the first exemplary embodiment

| Laser power | E | 5 | mW |
|---|---|---|---|
| Number of luminous points | N | 2 | — |
| Interval of luminous points | d1 | 90 | μm |
| Wavelength of use | λ | 780 | nm |
| Incident F-number in main scanning direction | Fm | 7 | — |
| Incident F-number in sub-scanning direction | Fs | 6.4 | — |
| Width of deflection plane in main scanning direction | W | 2.83 | mm |
| Width of effective light beams in main scanning direction | Wo | 5.06 | mm |
| Circumscribed circle diameter of polygon | φ1 | 7.4 | mm |
| Inscribed circle diameter of polygon | φ2 | 6.84 | mm |
| Inclination of incident beams in sub-scanning direction | θ | 3 | deg. |
| Number of deflection planes | M | 8 | — |
| Scanning efficiency | Du | 90 | % |
| Maximum scanning angle | ±α | 40.5 | deg. |
| Magnification of imaging optical system in sub-scanning direction | Bs | 2 | times |
| Effective scanning width | 2Yo | 214 | mm |
| Spot diameter in main scanning direction | Pm | 60 | μm |
| Spot diameter in sub-scanning direction | Ps | 70 | μm |

TABLE 2

Specification of scanning optical system in the first exemplary embodiment

| | Surface | R | D | N |
|---|---|---|---|---|
| LD | 1st | — | 5.29 | 1 |
| Cylinder | 2nd | ∞ | 5 | 1.762 |
| | 3rd | Table 3 | 32.80 | 1 |
| Spherical lens | 4th | ∞ | 5 | 1.762 |
| | 5th | −29.86 | 66.97 | 1 |
| POLY | 6th | ∞ | 44.45 | 1 |
| fθ lens | 7th | Table 3 | 10.7 | 1.522 |
| | 8th | Table 3 | 119.47 | 1 |
| Surface to be scanned | 9th | ∞ | — | — |

TABLE 3

Aspherical shape of imaging optical system in the first exemplary embodiment

| | | Cylinder | fθ lens | |
|---|---|---|---|---|
| | | 3rd | 7th | 8th |
| Generatrix | R | ∞ | 7.7956E+01 | 1.6946E+02 |
| | K | 0 | −7.2950E+00 | −2.1925E+00 |
| | B4 | 0 | −1.8300E−06 | −2.6462E−06 |
| | B6 | 0 | 7.0718E−10 | 7.2982E−10 |
| | B8 | 0 | −1.4905E−13 | −1.4716E−13 |
| | B10 | 0 | 1.5955E−17 | 1.7906E−17 |
| Meridian | R | −7.33E+00 | −1.781E+01 | −1.124E+01 |
| | D2 | 0 | 1.289E−03 | 4.824E−04 |
| | D4 | 0 | 6.317E−07 | −9.092E−08 |
| | D6 | 0 | 9.189E−11 | 2.427E−11 |
| | D8 | 0 | −8.188E−15 | 6.829E−15 |
| | D10 | 0 | 7.301E−17 | −2.906E−18 |
| Curvature of generatrix | A0 | — | — | 0 |
| | A2 | — | — | 0 |
| | A4 | — | — | 0 |
| | A6 | — | — | 2.89E−12 |

The aspherical shape of the first lens surface R1 of the toric lens 8 is defined by the following expressions.

When the point of intersection of the optical axis and the first lens surface R1 is defined as the origin, an axis along the optical-axis direction is defined as as the X axis, an axis orthogonal to the optical axis in the main scanning section is defined as the Y axis, and an axis orthogonal to the optical axis in the sub-scanning section is defined as the Z axis; a generatrix can be defined as a line on the first lens surface R1 of the toric lens 8 where the first lens surface R1 is cut by the X-Y plane, and meridians can be defined as lines on the first lens surface R1 of the toric lens 8 where the first lens surface R1 is cut by cutting planes parallel to the Z axis, each plane including a line normal to the curved surface at the position Z=0. At this time, the shape of the generatrix is represented by Expression 1.

Expression 1:

$$X = \frac{Y^2/R}{1+\sqrt{(1-(1+K)\times(Y/R)^2}} + B_4Y^4 + B_6Y^6 + B_8Y^8 + B_{10}Y^{10} \quad (1)$$

Where, R indicates a curvature radius, and K, $B_4$, $B_6$, $B_8$, and $B_{10}$ indicate aspherical coefficients of the generatrix.

The shape of the meridian is represented by Expression 2.

Expression 2:

$$S = \frac{Z^2/r'}{1+\sqrt{(1-(Z/r')^2}} \quad (2)$$

At this time, a curvature radius r', which varies as a function of the value of Y, is represented by Expression 3.

Expression 3:

$$r' = r_0 \times (1 + D_2Y^2 + D_4Y^4 + D_6Y^6 + D_8Y^8 + D_{10}Y^{10}) \quad (3)$$

Where, S indicates a distance in the direction of a line normal to the curved surface of the lens at Z=0 between a point on a meridian at a position of Z=0 and another point on the meridian, $r_0$ indicates the curvature radius of the meridian on the optical axis, and $D_2$, $D_4$, $D_6$, $D_8$, and $D_{10}$ are coefficients.

Figure 6:
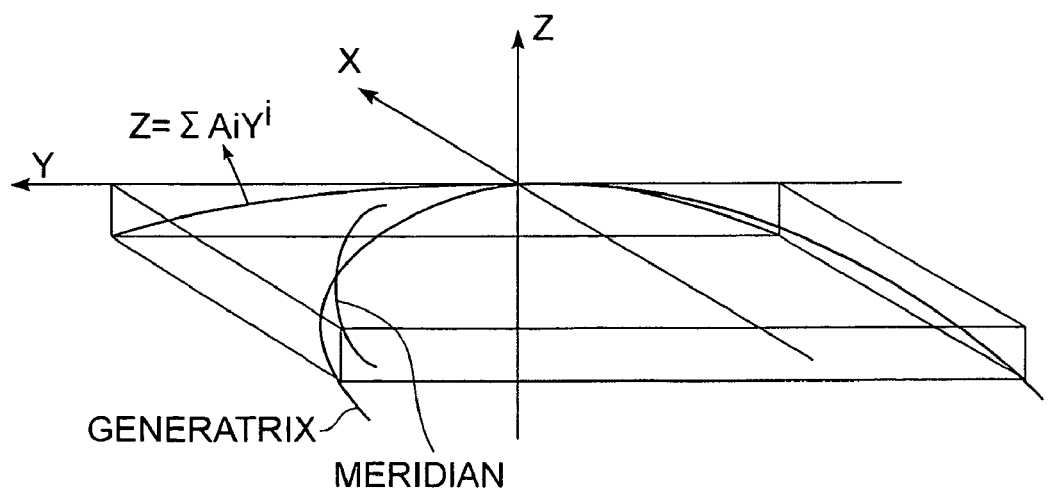
FIG. 6 illustrates the shape of a lens surface of a toric lens according to the first exemplary embodiment of the present invention.

FIG. 6 illustrates the shape of the second lens surface (toric surface) R2 of the toric lens (fθ lens) 8. The shape of the generatrix of the second lens surface R2 is represented by Expression 1, and the shape of the meridian is represented by Expressions 2 and 3 as in the case of the first lens surface R1. Moreover, in the schematic view, the optical axis of the toric lens corresponds to the X axis, and the main scanning direction is along the Y axis. The generatrix is formed by connecting the vertexes of the meridians, and the Z-axis component of the generatrix is represented by the following expression as a polynomial of the Y coordinate:

$$Z = \Sigma A_i Y^i \ (i=0, 1, 2, \ldots)$$

At this time, meridians can be defined as lines on the second lens surface R2 of the toric lens 8 where the second lens surface R2 is cut by cutting planes parallel to the Z axis, each plane including a line normal to the curved surface at the position Z=0 when the point of intersection of the optical axis and the second lens surface R2 can be defined as the origin, the axis along the optical-axis direction can be defined as the X axis, the axis orthogonal to the optical axis in the main scanning section can be defined as the Y axis, and the axis orthogonal to the optical axis in the sub-scanning section can be defined as the Z axis. In this exemplary embodiment, the Z-axis component is represented by a sixth-degree polynomial. This expression represents the degree of the curvature of the generatrix in the sub-scanning direction projected to the Y-Z plane, and corresponds to FIG. 6 described above.

[Image-forming Apparatus]

Figure 7:
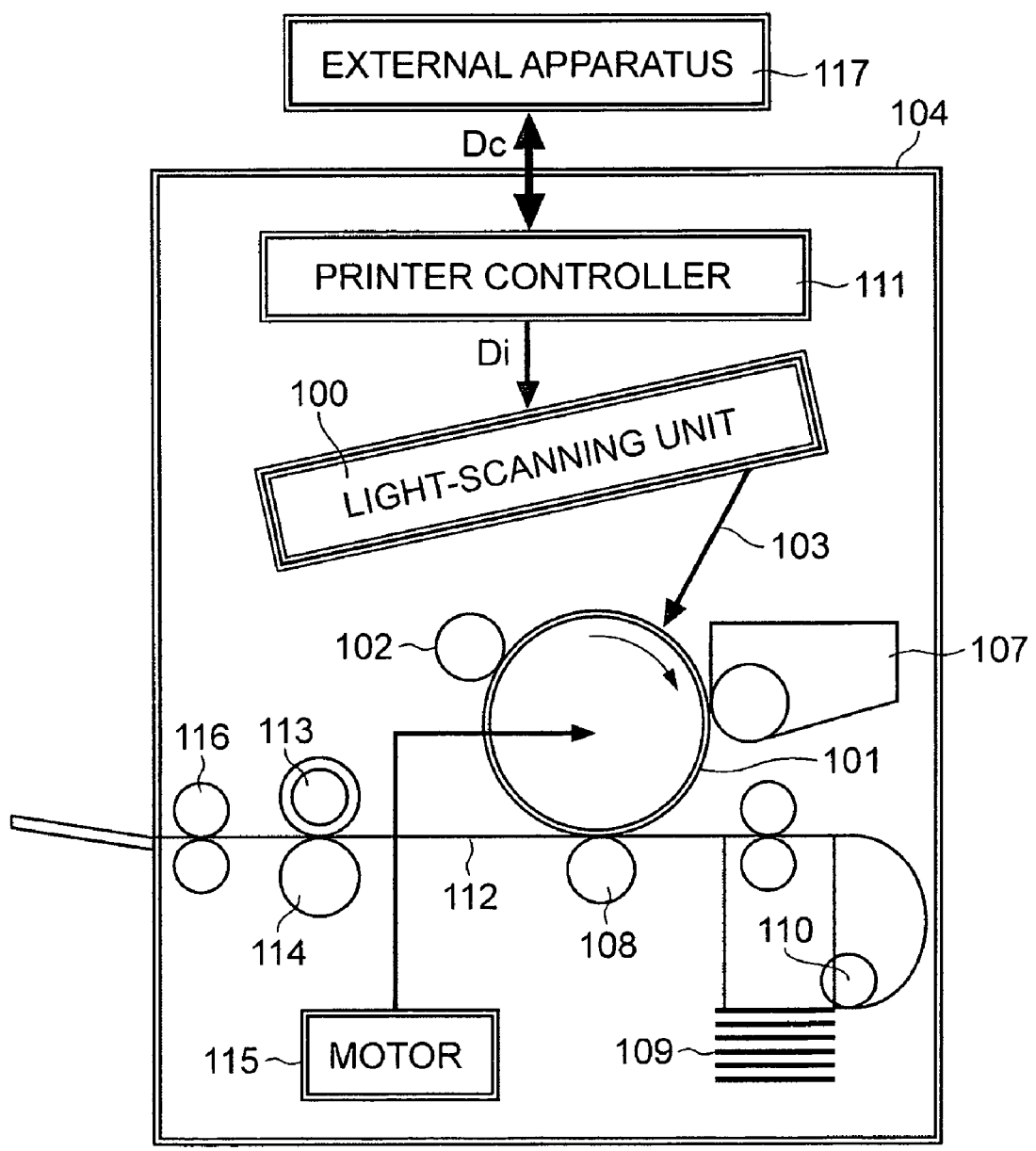
FIG. 7 is a schematic of a sub-scanning section of an image-forming apparatus according to an exemplary embodiment of the present invention.

FIG. 7 is a sub-scanning section of principal parts of an image-forming apparatus according to an exemplary embodiment of the present invention. In the drawing, an image-forming apparatus 104 receives code data Dc input by an external apparatus 117 such as a personal computer. The code data Dc is converted into image data (dot data) Di by a printer controller 111 in the apparatus. The image data Di is input to a light-scanning unit 100, which can have the structure described in the first exemplary embodiment. The light-scanning unit 100 emits light beams 103 modulated on the basis of the image data Di, and the light beams 103 scan a photosensitive surface of a photosensitive drum 101 in the main scanning section.

The photosensitive drum 101 serving as a carrier of electrostatic latent images (photoconductor) is rotated by a motor 115 in the clockwise direction. With this rotation, the photosensitive surface of the photosensitive drum 101 moves with respect to the light beams 103 in the sub-scanning section orthogonal to the main scanning section. An electrifying roller 102 for uniformly charging the surface of the photosensitive drum 101 is disposed at an upper position of the photosensitive drum 101 so as to be in contact with the surface. The light beams 103 emitted by the light-scanning unit 100 are incident on the surface of the photosensitive drum 101 charged by the electrifying roller 102.

As described above, the light beams 103 are modulated on the basis of the image data Di, and the irradiation of the light beams 103 forms the electrostatic latent images on the surface of the photosensitive drum 101. The electrostatic latent images are developed as toner images by a developing unit 107 disposed further downstream of the rotation direction of the photosensitive drum 101 than the irradiation position of the light beams 103 so as to be in contact with the photosensitive drum 101.

The toner images developed by the developing unit 107 are transferred to a paper sheet 112 serving as a recording material by a transferring roller 108 disposed at a lower position of the photosensitive drum 101 so as to face the photosensitive drum 101. The paper sheet 112 is accommodated in a sheet cassette 109 disposed in the anterior position (right side in FIG. 7) of the photosensitive drum 101, but manual paper feed is also available. A paper-feeding roller 110 is disposed at an end of the sheet cassette 109 so as to feed the paper sheet 112 in the sheet cassette 109 to a feeding route.

The paper sheet 112 to which the unfixed toner images are transferred is then fed to a fixing unit disposed in the posterior position (left side in FIG. 7) of the photosensitive drum 101. The fixing unit includes a fixing roller 113, which can have a fixing heater (not shown) therein and a pressurizing roller 114 pressed into contact with the fixing roller 113. The paper sheet 112 fed from the transferring unit is heated while being pressurized between the fixing roller 113 and a pressurizing part of the pressurizing roller 114, and thus the toner images are fixed on the paper sheet 112. Furthermore, a paper-ejecting roller 116 is disposed in the posterior of the fixing roller 113 such that the paper sheet 112 on which the toner images are fixed is ejected from the image-forming apparatus.

Although not shown in FIG. 7, the printer controller 111 not only converts the data as described above, but also controls components inside the image-forming apparatus such as the motor 115, and a polygon motor in a scanning unit described below.

The recording density of the image-forming apparatus used in at least one exemplary embodiment is not particularly limited. However, the structure according to the first exemplary embodiment of at least one exemplary embodiment is more effective in image-forming apparatuses of 1200 dpi or higher resolution since higher resolution is required as the recording density becomes higher.

[Color-image Forming Apparatus]

Figure 8:
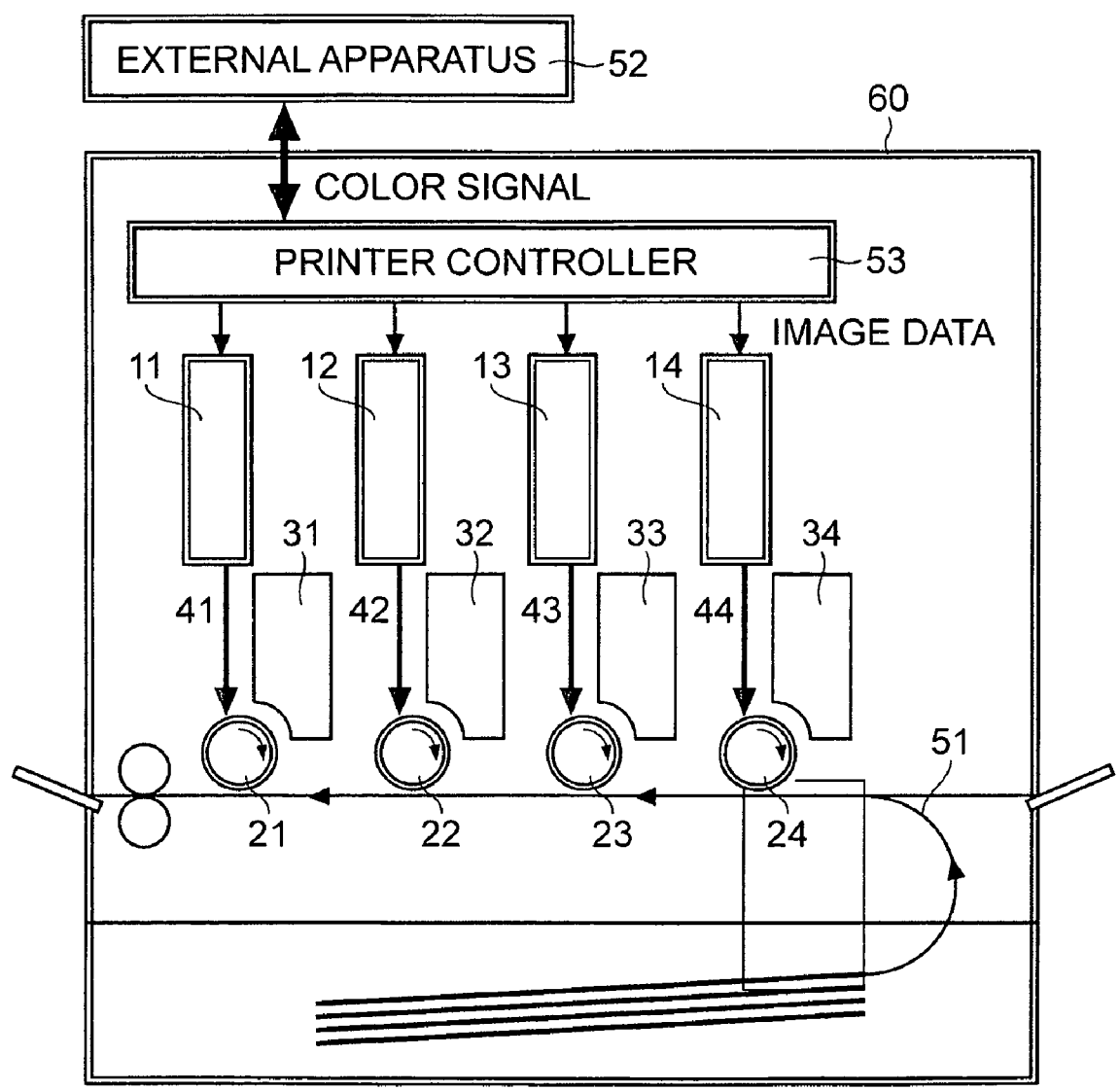
FIG. 8 is a schematic view of principal parts of a color-image forming apparatus according to an exemplary embodiment of the present invention.

FIG. 8 is a schematic view of principal parts of a color-image forming apparatus according to an exemplary embodiment of the present invention. The color-image forming apparatus according to this exemplary embodiment is of a tandem type that has four optical scanning apparatuses disposed parallel to each other each recording image information on a surface of a respective photosensitive drum serving as a carrier of images. FIG. 8 shows a color-image forming apparatus 60, optical scanning apparatuses 11, 12, 13, and 14 each, which can have the structure according to the first exemplary embodiment, photosensitive drums 21, 22, 23, and 24 each serving as a carrier of images, developing units 31, 32, 33, and 34, and a feeding belt 51.

In FIG. 8, the color-image forming apparatus 60 receives color signals of red (R), green (G), and blue (B) input by an external apparatus 52 such as a personal computer. These color signals are converted into image data (dot data) of cyan (C), magenta (M), yellow (Y), and black (K) by a printer controller 53 in the apparatus. Pieces of the image data are input to the respective optical scanning apparatuses 11, 12, 13, and 14. These optical scanning apparatuses 11, 12, 13, and 14 emit light beams 41, 42, 43, and 44, respectively, modulated on the basis of the image data, and the light beams 41, 42, 43, and 44 each scan a photosensitive surface of the respective photosensitive drums 21, 22, 23, and 24 in the main scanning section.

The color-image forming apparatus according to this exemplary embodiment includes the four aligned optical scanning apparatuses 11, 12, 13, and 14 corresponding to the colors of C, M, Y, and K, respectively. The optical scanning apparatuses 11, 12, 13, and 14 record image signals (image information) on the surfaces of the photosensitive drums 21, 22, 23, and 24 in tandem with each other. In this manner, color images are printed at high speed.

As described above, the color-image forming apparatus according to this exemplary embodiment forms the latent images of four colors on the surfaces of the respective photosensitive drums 21, 22, 23, and 24 by using the four optical scanning apparatuses 11, 12, 13, and 14 with the light beams formed on the basis of the image data of four colors. Subsequently, the latent images are transferred to a recording material so as to be overlapped, and thus a full-color image is formed.

A color-image reading apparatus including a charge-coupled device (CCD) sensor, for example, can be used as the external apparatus 52. In this case, the color-image reading apparatus and the color-image forming apparatus 60 form a color digital copier.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-153931 filed May 26, 2005, which is hereby incorporated by reference herein in its entirety.

What is claimed is:

1. An optical scanning apparatus comprising:
a light-source unit;
an incident optical system for directing light beams emitted from the light-source unit to a deflecting unit; and
an imaging optical system for guiding the light beams deflected from the deflecting unit to a surface to be scanned, wherein
the imaging optical system comprises a toric lens whose power in the main scanning direction is different from that in the sub-scanning direction; in which
the curvature centers of the meridians of a first toric surface of the toric lens connected to form a curved line are located in a common plane Ha, and the curvature centers of the meridians of a second toric surface connected to form a curved line are not located in a common plane, and in which
the plane Ha is not parallel to principal rays of incoming beams incident on the toric lens traveling toward the central image height of the surface to be scanned in the sub-scanning section.

2. An image-forming apparatus comprising:
the optical scanning apparatus according to claim 1;
a photosensitive member disposed on a surface to be scanned;
a developing unit for developing electrostatic latent images on the light beams member as toner images, the electrostatic latent images being formed by the light beams that are emitted by the optical scanning apparatus and scan the photosensitive member;
a transferring unit for transferring the developed toner images to a recording material; and
a fixing unit for fixing the transferred toner images on the recording material.

3. An image-forming apparatus comprising:
the optical scanning apparatus according to claim 1; and
a printer controller convening code data input by an external apparatus into image signals and sending the signals to the optical scanning apparatus.

4. An optical scanning apparatus comprising:
a light-source unit;
an incident optical system for directing light beams emitted from the light-source unit to a deflecting unit; and
an imaging optical system for guiding the light beams deflected from the deflecting unit to a surface to be scanned, wherein
the imaging optical system comprises a toric lens whose power in the main scanning direction is different from that in the sub-scanning direction; in which
the curvature centers of the meridians of a first toric surface of the toric lens connected to form a curved line are located in a common plane Ha, and the curvature centers of the meridians of a second toric surface connected to form a curved line are not located in a common plane, and in which
the first toric surface of the toric lens has areas that satisfy the following condition:

$$100 \leq |Ra| \text{ (mm)},$$

where Ra indicates the curvature radii of the meridians.

5. An image-forming apparatus comprising:
the optical scanning apparatus according to claim 4;
a photosensitive member disposed on a surface to be scanned;
a developing unit for developing electrostatic latent images on the photosensitive member as toner images, the electrostatic latent images being formed by the light beams that are emitted by the optical scanning apparatus and scan the photosensitive member;
a transferring unit for transferring the developed toner images to a recording material; and
a fixing unit for fixing the transferred toner images on the recording material.

6. An image-forming apparatus comprising:
the optical scanning apparatus according to claim 4; and
a printer controller convening code data input by an external apparatus into image signals and sending the signals to the optical scanning apparatus.

7. An optical scanning apparatus comprising:
a light-source unit;

an incident optical system for directing light beams emitted from the light-source unit to a deflecting unit; and an imaging optical system for guiding the light beams deflected from the deflecting unit to a surface to be scanned, wherein the imaging optical system comprises a toric lens whose power in the main scanning direction is different from that in the sub-scanning direction; in which the curvature centers of the meridians of a first toric surface of the toric lens connected to form a curved line are located in a common plane Ha, and the curvature centers of the meridians of a second toric surface connected to form a curved line are not located in a common plane, and in which the degree of curvature ΔA of a generatrix of the second toric surface satisfies the following conditions:

$$0 \leq \Delta A \leq 1 \text{ (mm)}$$

$$\Delta A = |Zmax - Zmin| \text{ (mm)},$$

where Zmax and Zmin indicate the maximum value and the minimum value, respectively, of the central positions of the curvature radii of the meridians of the second toric surface in the Z direction when the point of intersection of the optical axis of the second toric surface and the curved surface of the second toric surface is defined as the origin, and an axis orthogonal to the optical axis in the sub-scanning section is defined as the Z axis.

8. An image-forming apparatus comprising:

the optical scanning apparatus according to claim 7;

a photosensitive member disposed on a surface to be scanned;

a developing unit for developing electrostatic latent images on the photosensitive member as toner images, the electrostatic latent images being formed by the light beams that are emitted by the optical scanning apparatus and scan the photosensitive member;

a transferring unit for transferring the developed toner images to a recording material; and a fixing unit for fixing the transferred toner images on the recording material.

9. An image-forming apparatus comprising:

the optical scanning apparatus according to claim 7; and a printer controller convening code data input by an external apparatus into image signals and sending the signals to the optical scanning apparatus.

\* \* \* \* \*